(12) United States Patent
Wellington et al.

(10) Patent No.: US 7,995,837 B2
(45) Date of Patent: Aug. 9, 2011

(54) SYSTEM AND METHOD FOR GENERATING A TERRAIN MODEL FOR AUTONOMOUS NAVIGATION IN VEGETATION

(75) Inventors: Carl K. Wellington, Pittsburgh, PA (US); Aaron C. Courville, Montreal (CA); Anthony J. Stentz, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 12/573,459

(22) Filed: Oct. 5, 2009

(65) Prior Publication Data

US 2010/0021052 A1 Jan. 28, 2010

Related U.S. Application Data

(62) Division of application No. 11/446,089, filed on Jun. 2, 2006.

(51) Int. Cl.
*G06K 9/00* (2006.01)

(52) U.S. Cl. ........ 382/154; 382/156; 382/157; 382/159; 701/90; 701/82; 701/38; 701/71; 701/41; 701/42

(58) Field of Classification Search .................. 382/154, 382/156, 157, 159; 701/90, 82, 38, 71, 41, 701/42
See application file for complete search history.

(56) References Cited

U.S. PATENT DOCUMENTS

| | | | |
|---|---|---|---|
| 5,402,340 A | 3/1995 | White et al. | |
| 5,548,512 A | 8/1996 | Quraishi | |
| 6,130,639 A | 10/2000 | Agnesina et al. | |
| 6,229,546 B1 | 5/2001 | Lancaster et al. | |
| 6,441,871 B1 | 8/2002 | Hori et al. | |
| 7,200,243 B2 | 4/2007 | Keenan et al. | |
| 7,272,474 B1 * | 9/2007 | Stentz et al. | 701/26 |
| 2001/0027456 A1 | 10/2001 | Lancaster et al. | |
| 2004/0158355 A1 * | 8/2004 | Holmqvist et al. | 700/245 |
| 2005/0047663 A1 * | 3/2005 | Keenan et al. | 382/225 |

* cited by examiner

*Primary Examiner* — Matt Bella
*Assistant Examiner* — Mike Rahmjoo
(74) *Attorney, Agent, or Firm* — Jones Day

(57) ABSTRACT

The disclosed terrain model is a generative, probabilistic approach to modeling terrain that exploits the 3D spatial structure inherent in outdoor domains and an array of noisy but abundant sensor data to simultaneously estimate ground height, vegetation height and classify obstacles and other areas of interest, even in dense non-penetrable vegetation. Joint inference of ground height, class height and class identity over the whole model results in more accurate estimation of each quantity. Vertical spatial constraints are imposed on voxels within a column via a hidden semi-Markov model. Horizontal spatial constraints are enforced on neighboring columns of voxels via two interacting Markov random fields and a latent variable. Because of the rules governing abstracts, this abstract should not be used to construe the claims.

14 Claims, 10 Drawing Sheets

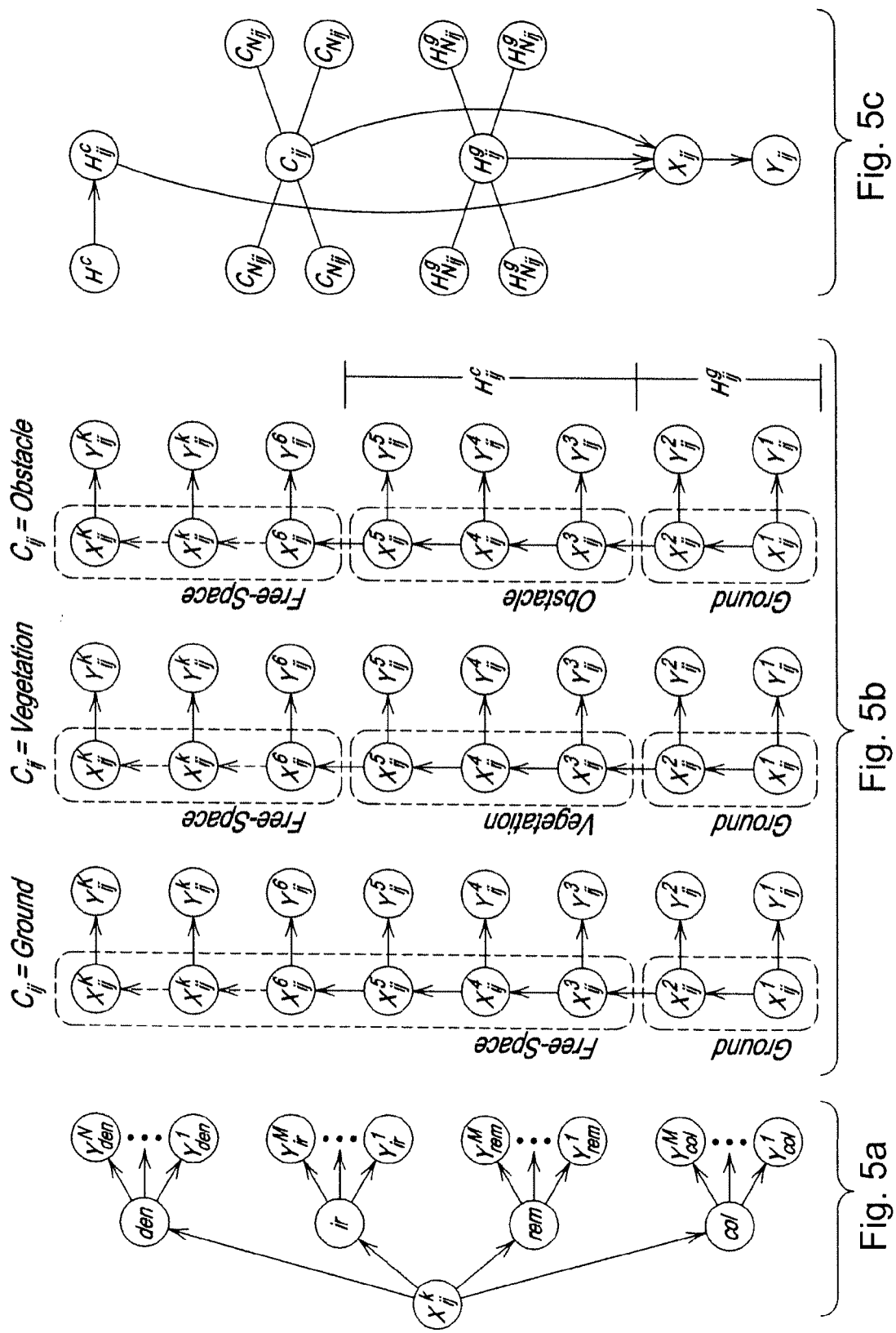

SYSTEM AND METHOD FOR GENERATING A TERRAIN MODEL FOR AUTONOMOUS NAVIGATION IN VEGETATION

CROSS-REFERENCE TO RELATED APPLICATIONS

The present application is a divisional of copending U.S. application Ser. No. 11/446,089 filed Jun. 2, 2006 and entitled System and Method for Generating a Terrain Model for Autonomous Navigation in Vegetation, the entirety of which is hereby incorporated by reference for all purposes

BACKGROUND

The present invention is directed generally to the field of autonomous or computer-aided navigation, and more particularly to systems and methods for classifying sensor data and inferring ground height for use in generating terrain models that may be used for autonomous or computer-aided navigation.

Outdoor environments such as those encountered in agriculture, mining, and the exploration of hazardous environments often have no structured features, such as road markers, straight walls, a flat ground plane, etc. For that reason, outdoor environments are viewed as being unstructured. The unstructured nature of those environments has often been cited as one of the reasons that navigating within those environments is considered to be so challenging.

Early work in terrain perception was applied to environments with smooth terrain and discrete obstacles and achieved good results in those domains by looking at the height above the ground surface of the sensor readings from individual grid cells. However, as shown in FIG. 1, the presence of vegetation makes the problem much more difficult because forward looking sensors such as a laser range-finder or stereo cameras produce range points above the ground surface but these range points do not represent obstacles. Classification of vegetation (also common in the remote sensing community) could allow an autonomous system to drive through vegetated areas, but classification is not sufficient for this task either because a grassy area on a steep slope may be dangerous to drive on whereas the same grass on a flat area could be easily traversable. A terrain model needs both classification and the ground height to allow safe navigation.

A number of researchers have investigated methods that use range data to discriminate sparse vegetation (as shown in FIG. 1) from solid substances such as the ground or obstacles. These techniques exploit the fact that range measurements often penetrate sparse vegetation, but do not penetrate solid obstacles. The properties used for discrimination fall into two categories: shape and density.

Shape-based methods begin with a 3D cloud of range points and look at local features of the data points to discriminate between the random spread of points in sparse vegetation and the organized structure of points on solid objects. Researchers have modeled the statistics of laser penetration in grass to find solid objects, and they have compared measurements across time and space to filter out areas where the penetration is continually changing. A comparison between techniques that look for the range shadow of solid obstacles and techniques based on local point statistics is given in M. Herbert et al., "Evaluation and comparison of terrain classification techniques from LADAR data for autonomous navigation," in 23$^{rd}$ Army Science Conference, December 2002. The strategy of computing local statistics about the spread of points was expanded in N. Vandapel et al., "Natural terrain classification using 3-D ladar data." In IEEE Int. Conf. on Robotics and Automation, April 2004, to discriminate between sparse vegetation, solid surfaces, linear structures such as branches, and even concertina wire N. Vandapel et al., "Finding organized structures in 3-d ladar data", in IEEE Int. Conf. on Intelligent Robots and Systems, 2004.

Density-based methods attempt to use range measurements to explicitly measure the density of objects in the environment. This has been done by dividing the world into small volumes of space and then maintaining density scores by keeping track of ladar hits and pass-through or ladar and radar measurements.

The above methods have shown promising results in sparse vegetation, but they do not address the problem of estimating the ground surface in dense vegetation where the ground is completely hidden as in FIG. 2. We have used online learning methods to automatically learn the ground height in vegetation from features (C. Wellington et al., "Online adaptive rough-terrain navigation in vegetation," in IEEE Int. Conf. on robotics and Automation, April, 2004), but the resulting ground surface estimates were very noisy. One reason for this is that this method makes the strong assumption of independence between terrain patches and makes predictions locally without incorporating spatial context. That can make it difficult to disambiguate data from tall vegetation and data from short vegetation, resulting in poor estimates of the hidden ground height. Without an accurate ground height estimate, an autonomous system may not be able to detect hazards such as steep slopes or ditches, and it may not be able to properly disambiguate solid obstacles from the ground surface. Thus, a need exists for a system and method for deriving an accurate terrain model which can be used to autonomously pilot a vehicle.

SUMMARY OF THE DISCLOSURE

Although off-road environments do not possess structured landmark features such as road markers, straight walls or a flat ground plane, they nevertheless possess a great deal of structure that humans frequently exploit in the performance of tasks we wish to automate. For example, consider a vehicle navigating through a field of vegetation or crop. We can use the knowledge that the ground is generally smooth and the vegetation has approximately constant height to infer the ground height and permit stable and robust navigation even through areas where the ground is not directly observed. The challenge lies in expressing this type of structure in a way that can be made useful in autonomous navigation tasks.

Our approach is a generative, probabilistic approach to modeling terrain. The model exploits the 3D spatial structure inherent in outdoor domains and an array of noisy but abundant sensor data to simultaneously estimate ground height, vegetation height and classify obstacles and other areas of interest, even in dense non-penetrable vegetation. Joint inference of ground height, class height and class identity over the whole model results in more accurate estimation of each quantity. For example, inferring the vegetation height permits an improved estimate of the height of the underlying ground. Similarly, knowing the ground height helps disambiguate solid obstacles from the ground surface.

Obstacle detection is particularly challenging because of the wide variety of objects that might be considered obstacles. People, buildings, equipment, fences and even holes are all obstacles we wish to avoid while navigating in off-road environments. There may be little in common between these things that we wish to classify as obstacles, and it is impractical to train classifiers to individually detect all possible types of obstacles. Instead, our approach is to treat obstacles as having uncertain attributes relative to the more accurate models of the known classes (such as vegetation or ground). As a result, the model considers surprising and otherwise unexplainable measurements as those most likely to be associated with an obstacle. This is a common approach in anomaly detection, and has been used for detecting obstacles in an agricultural domain.

To help constrain the problem of joint obstacle detection and supporting ground surface estimation, our terrain model incorporates a number of spatial assumptions. Two of these are encoded by distinct but interacting Markov random field (MRF) models. One MRF models ground height and enforces our assumption that ground height is smoothly varying. The second MRF encodes our assumption that regions associated with a particular class tend to cluster (for example, patches of vegetation of a single type tend to be found together). In addition to the MRF layers, a simple latent variable model is used to express an assumption that vegetation of the same type has a similar height. These three components interact through a hidden semi-Markov model (HSMM) that enforces vertical structural assumptions such as the understanding that vegetation grows on top of ground.

The spatial constraints embodied in the terrain model are combined with information from multiple sensors on the vehicle. The sensor models are automatically learned from training data collected by driving over representative terrain. Our use of MRFs to encode horizontal spatial correlations precludes an analytical solution to the inference problem. However, by exploiting an organization of our data into vertical HSMM columns, our approach allows us to model 3D structure in a reasonably efficient inference scheme. Gibbs sampling over the MRF structures lets us perform exact inference in the HSMM models using an efficient dynamic programming algorithm. This substantially reduces computation time over a full 3D MRF model, and although our approach is computationally demanding, the system can run in real-time.

The present disclosure is directed to a system for determining surface height comprising a sensor array for producing data about a volume in which surface height is to be determined. The volume is divided into a plurality of voxels which are to be classified. A plurality of surface modeling rules is provided for providing domain information for interpreting data from the sensor array, for enforcing spatial constraints vertically among voxels, and for enforcing spatial constraints horizontally among columns of voxels. An inference engine is responsive to the sensor array and the surface modeling rules so to classify each voxel, with at least certain of the voxels being classified as surface.

BRIEF DESCRIPTION OF THE DRAWINGS

The present disclosure will now be described, for the purposes of illustration and not limitation, in conjunction with the following figures wherein:

FIGS. 5A, 5B, and 5C are graphical representations of the model of the present disclosure illustrating the voxel, the voxel column, and the connections between voxel columns, respectively. For each voxel column ij, the model contains voxel states $X^k_{ij}$, observations $Y^k_{ij}$, and a class $C_{ij}$, class height $H^c_{ij}$, and ground height $H^g_{ij}$ that interact with neighbors $N_{ij}$ and the common class height HC;

DESCRIPTION OF THE PREFERRED EMBODIMENT

Figure 1:
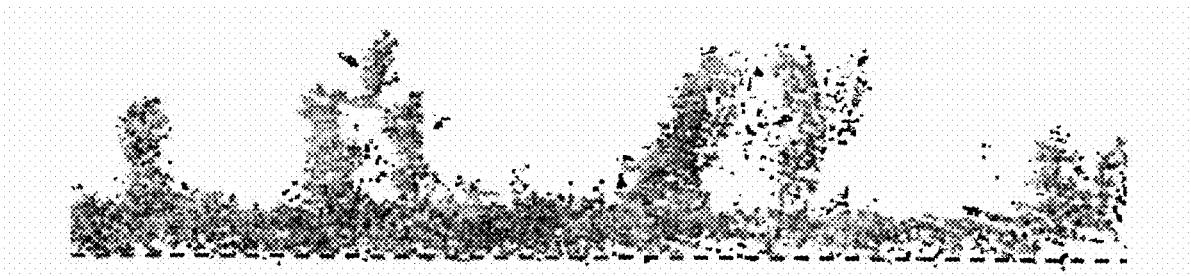
FIG. 1 is a side view of penetrable vegetation data, with approximate ground height. There are range points on the ground and the vegetation.
Figure 2:
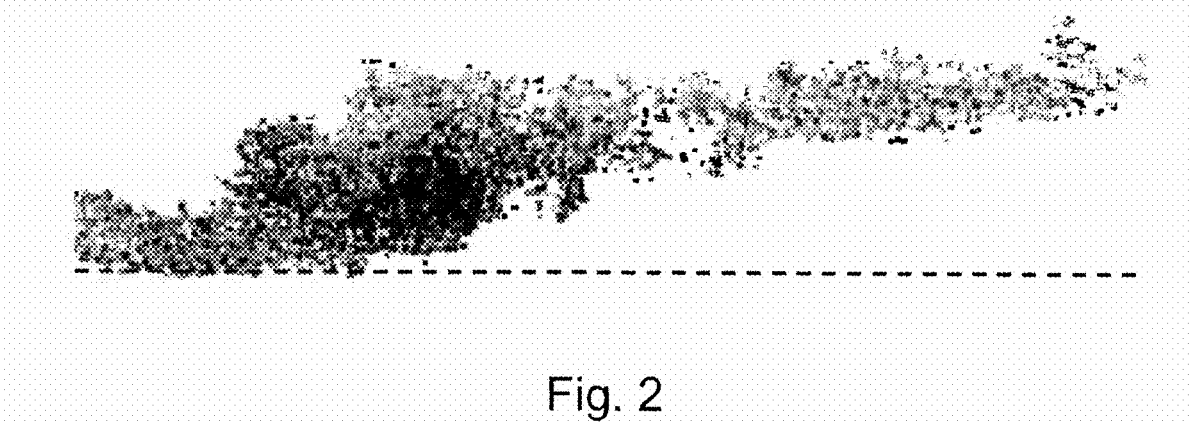
FIG. 2 is a side view showing a transition from low grass on the left to tall, dense, non-penetrable vegetation on the right, with approximate ground height. In the tall, dense, vegetation, there are only range points on the top of the vegetation and the ground remains hidden.
Figure 3:
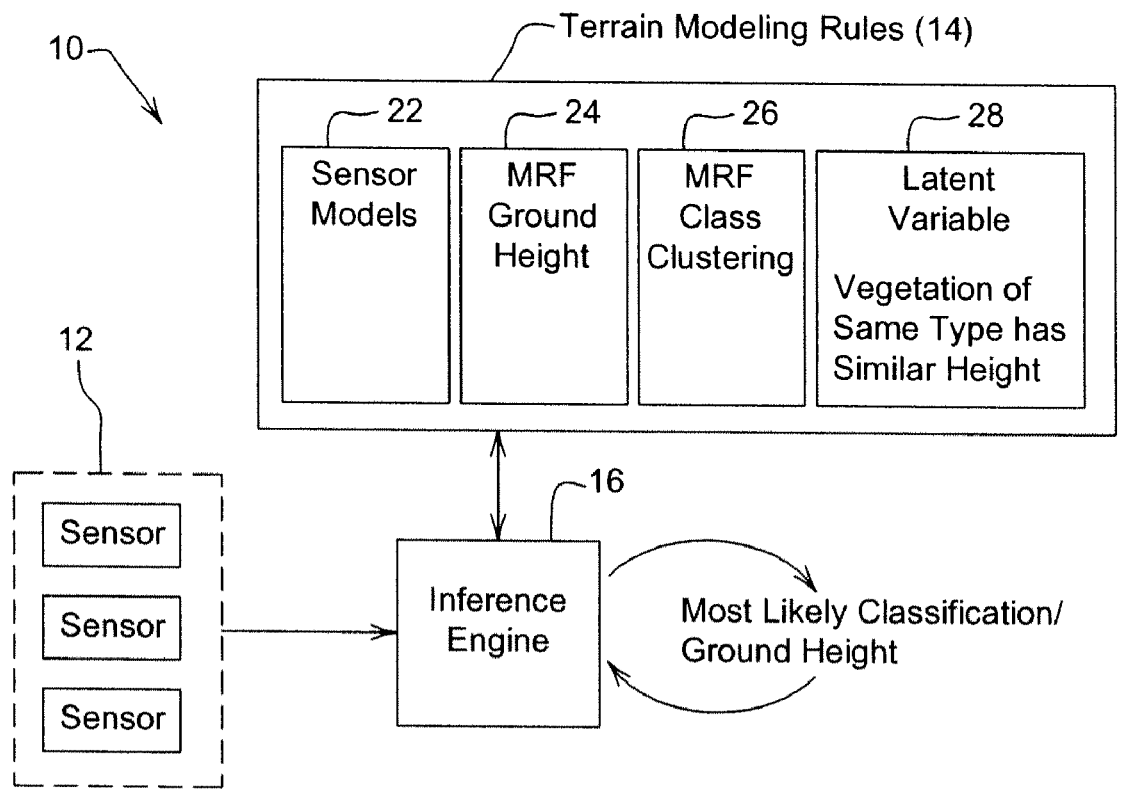
FIG. 3 is a block diagram of the system of the present disclosure.

FIG. 3 illustrates a system 10 constructed according to the teachings of the present disclosure. The system 10 is constructed of an array of sensors 12, terrain modeling rules 14, and an inference engine 16 responsive to both the sensor array 12 and the terrain modeling rules 14. In attempting to classify the terrain in any given volume 18, see FIG. 4, the volume 18 is divided into a plurality of small cubes 20 called voxels. Each voxel 20 is assigned an initial class (ground, vegetation, obstacle, or open space) by the inference engine 16 based on information provided by the sensor array 12 operating in conjunction with sensor models 22, which are part of the terrain modeling rules 14. Note that the sensor models 22 have been trained (as is discussed below) to recognize classes.

For example, the sensor array 12 may be comprised of a video camera, an infrared sensor, and a laser range finder. The data produced by these sensors is processed by the inference engine 16 in conjunction with the sensor models 22 to provide an initial classification for the voxels 20. However, the data produced by the sensor array 12 is often noisy and difficult to interpret. For example, assume that there is a puddle of water in the middle of a road. The puddle of water may be reflecting a blue sky. If a voxel assigned to represent the space in the middle of the puddle is classified simply on the basis of sensor data, the system 10 may conclude that the voxel 20 assigned to the space in the middle of the puddle represents open space, which is clearly incorrect.

The present invention represents a substantial advance over prior art systems which rely merely upon sensor arrays and sensor models for classification. First, the present invention imposes a spatial structure on each column of voxels. That is, the vegetation class must be above the ground class, and the open space class must be above the vegetation class. Once a class has been firmly established, for example, the vegetation class, it is not possible for a voxel above the vegetation class to be assigned a classification of ground. Such a spatial structure is, of course, intuitive to humans but must be enforced in the system 10 through the terrain modeling rules 14.

A second advantage of the present invention is that the initial classification, and subsequent classification of voxels, are influenced by the classification of neighboring voxels. For example, a voxel representing a space in the middle of the road can be more easily classified as a ground class, by recognizing that all of the voxels around it have also been classified as ground. This neighboring dependence is enforced again through the terrain modeling rules 14 by imposing on the system rules such as similar vegetation will have a similar height, neighboring patches of ground will have a similar height, and similar classes will tend to cluster together.

The rules are imposed by a first markov random field 24, a second markov random field 26 and a latent variable as is described in greater detail below.

The inference engine 16 is a software package which is capable of taking the output of sensor array 12, manipulating the data according to the terrain modeling rules 14, and producing an output which is the most likely ground height and most likely class. That output, may be fed through the inference engine several times to allow the latest information, and best guesses regarding the ground height and classification of voxels, to propagate throughout the model. After a number of iterations, the inference engine 16 produces a most likely ground height and a most likely classification which may be used by any of a number of commercially available systems for autonomously driving the vehicle.

Figure 4:
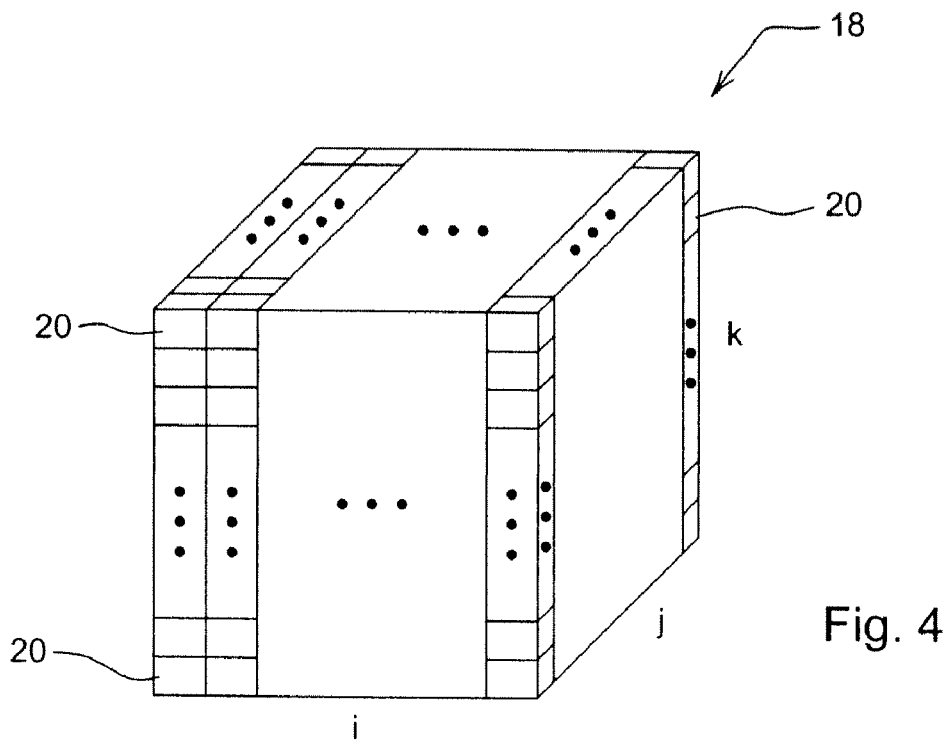
FIG. 4 illustrates a volume of space broken into voxels.

The basic representational structure of our terrain model is the voxel 20, see FIG. 4, e.g. a 15 cm$^3$ box-shaped region of three dimensional space. We represent the vehicle's local spatial environment as a voxel lattice of size i×j×k, where the ijkth voxel is in the ijth position of a horizontal 2D grid and the kth position above an arbitrary subterranean origin.

Accurate global vehicle pose allows us to assign ladar points corresponding to the same region of space to the same voxel. Exploiting the precise synchronization of the sensors, we project ladar points into the most recent color and infrared images, so that each ladar point results in a vector of appearance measurements for that voxel, including laser remission (reflectance), infrared temperature, and color. Because the ladar scans come in at a much higher rate than the image data, multiple scans are projected into the same image. However, the high pixel density of the images means that we collect approximately 100 pixels for every ladar point. That coupled with the continual movement of the scanning ladars makes it unlikely that a single pixel is used more than once, so we treat each color and infrared tagged ladar point as an independent measurement.

The voxel representation also allows us to maintain a density estimate throughout space by comparing how many ladar rays pass through each voxel (pass-throughs) with the number of ladar rays that hit something in that voxel (hits). Density information is valuable when trying to separate sparse vegetation that contains a mixture of hits and pass-throughs from solid objects that contain a majority of hits and only a few pass-throughs due to sensor noise.

Although our data representation is based on the voxel, vehicle navigation is generally performed on a 2D surface, so our ground height estimates and classification results are made in terms of voxel columns. In our model, the ijth voxel column class is described with a multinomial distributed random variable $C_{ij}$ taking on values related to the possible contents of the column, $C_{ij}=c$ with e.g. $c \in \{$ground, vegetation, obstacle$\}$.

Associated with the kth voxel in the ijth voxel column is the voxel state $X^k_{ij}$, a multinomial distributed random variable that describes the nature of the material inside the voxel, $X^k_{ij} \in \{$ground, c, free-space$\}$ where c is the class of the ijth voxel column. In our implementation, the possibility of a voxel column simultaneously containing obstacle and vegetation is excluded, though its inclusion is a trivial extension of the model we present. The ijkth voxel is also associated with the observation vector $Y^k_{ij}=[Y_{den}, Y_{rem}, Y_{ir}, Y_{col}]$, containing vectors of N ladar hit and pass-through density measurements of which the M hits include laser remission values, infrared temperatures and color data (i.e. $Y_{den}=[Y^1_{den}, \ldots Y^N_{den}]$, $Yrem=[Y^1_{rem}, \ldots Y^M_{rem}]$).

We use a probabilistic generative model to encode the desired spatial correlation assumptions described above. We now describe the model at three different levels: Voxel observation models; Vertical column structure; and Horizontal neighborhood structure. Those levels build on each other from the inside out, going from an individual voxel to a voxel column to the entire grid of voxel columns. FIGS. 5A, 5B, and 5C give a graphical representation of each of these three levels.

Before describing each level of the model in detail, we offer a perspective on the entire model by exploring the process of generating measurement data. The model contains the two MRFs 24, 26. One MRF 24 codifies our assumption that the ground height varies smoothly with distance. Thus we expect the ground height of voxel column ij to be similar to the ground heights of the neighboring voxel columns. From a generative perspective, conditioned on the values of the neighboring ground heights we sample the ground height of voxel column ij. Similarly, we assume that neighboring voxel columns will tend to be members of the same class. Once again, that assumption is represented as MRF 26 and by conditioning on the class memberships of the neighboring columns we can directly sample a class membership for voxel column ij. To recover the ground heights and class memberships of all the voxel columns, this process is repeated for all ij.

In addition to the ground height and class membership, a vegetation class height must also be determined for each voxel column with a "vegetation" class membership. We model the distribution of heights of a particular vegetation class as a Gaussian centered about some global mean height. For each vegetation class, a global class mean height is sampled, and then conditioned on these mean heights, the individual class heights of the corresponding voxel columns are sampled.

Once the ground height, class membership and vegetation class heights are determined, their values are used to constrain the properties of each voxel column which is described using a hidden semi-Markov model. Each class has an associated HSMM model that determines the state values for each voxel in the vertical chain. For instance, below the sampled ground height, all states assume the value "ground". For the vegetation classes, the states between the ground height and the vegetation height are "vegetation" and above that the voxels are "free-space".

Conditioned on the values of the voxel states, the material properties, such as color, laser remission, infrared temperature and density are all sampled independently from the appropriate state specific distribution (e.g. ground, vegetation, or obstacle). Finally, conditioned on the values of each material property, measurements are sampled independently from the various measurement models.

While it is instructive to understand the model from a generative perspective, in general we are more interested in the opposite problem: how can one use the model to infer ground heights, class memberships and vegetation class heights from real sensor data. We now describe the three levels of the model in more detail.

Voxel Observation Models

We assume that voxels form the smallest indistinguishable element of space, occupied completely by one (and only one) voxel state. Each voxel state maintains a distribution over material properties including density, remission, infrared temperature, and color that describe the characteristics of that state, but the material inside a single voxel is assumed to be uniform. For example, the vegetation state may include a range of colors, and therefore different voxels in vegetation may have different colors, but we assume that the color of the vegetation within each voxel is uniform.

The measurement vector, $Y^k_{ij}$ contains a variable number of noisy measurements of the material properties. The graphical model in FIG. 5A illustrates the conditional independencies between the voxel state $X^k_{ij}$, the material property random variables den, rem, ir, and col, and the measurements. Conditional on $X^k_{ij}$, the material properties are independent, and conditional on the material properties, the measurements are independent. The voxel material properties are not directly observed, and we are not concerned with their values beyond what they reveal about the state. Thus the material properties constitute nuisance variables that we remove from the observation models through marginalization, as described below.

The distributions over the voxel appearance properties, including infrared temperature, laser remission, and color are all inherently multi-modal and thus not well described by a simple parametric distribution. For example, remission values in vegetation are either high because of the strong reflectivity of chlorophyll, or very low due to small cross-sectional area. We resort to a mixture of Gaussians to describe the distribution of the material properties within a state.

We develop the marginal distribution for the remission values, but the infrared and color data are determined analogously. The true material property rem for state x is modeled as a mixture of Gaussians with individual mixture means $rem_i$, variances $\sigma^2_i$, and mixing coefficients $P(i)$ $$p(rem | X^k_{ij} = x) = \sum_{i=1}^{R} P(i) \frac{1}{\sqrt{2\pi\sigma^2_i}} \exp\left(-\frac{(rem - rem_i)^2}{2\sigma^2_i}\right) \quad (1)$$

Conditional on the true material property rem, the measurements $y^m_{rem}$ are assumed to be normally distributed, $Y^m_{rem} \sim N(rem, \sigma^2_y)$ We integrate out the nuisance variable rem to get the marginal likelihood for all the remission data $y_{rem} = [y^1_{rem}, \ldots, y^M_{rem}]$, resulting in a mixture of Gaussians that is a function of the data mean $y_{rem}$.

$$p(y_{rem} | X^k_{ij} = x) = \int p(y_{rem} | rem) p(rem | X^k_{ij} = x) d(rem) \quad (2)$$

$$= \sum_{i=1}^{R} P(i)$$

$$\int \prod_{m=1}^{M} p(y^m_{rem} | rem) p(rem | rem_i) d(rem)$$

$$= \sum_{i=1}^{R} P(i) \frac{1}{\sqrt{2\pi\left(\sigma^2_i + \frac{\sigma^2_y}{M}\right)}}$$

$$\exp\left(-\frac{(\bar{y}_{rem} - rem_i)^2}{2\left(\sigma^2_i + \frac{\sigma^2_y}{M}\right)}\right)$$

The inclusion of the voxel material property "nuisance parameter" (i.e. rem in FIG. 5A and in the above equations) is important. If instead, the measurements were modeled as emanating directly from the voxel state $x^k_{ij}$, then accumulating measurements for a given voxel would accumulate probability mass for a specific state value. That is not correct. More measurements of the same quantity should only make the system more certain about the material property rem, not the state value x. Marginalizing the material property rem out, we obtain the desired behavior shown in equation 2, where the appearance marginal likelihood distributions $p(y_{rem}|x)$ become more broad when there are few data points (M is small). This reflects the increased uncertainty in the material property and hence the state. As more measurements are incorporated, the appearance likelihood $p(y_{rem}|x)$ converges to the material property likelihood $p(rem|x)$.

Voxel density values range from empty space (den=0) to completely solid (den=1). Analogous to the Gaussian mixture models used for voxel appearance properties, the distribution of density values for a given state x can be well modeled using a beta distribution $B(a_x, b_x)$ which operates in the range [0,1] and has parameters $a_x$ and $b_x$ that together specify its mean and variance.

The measurements of density $Y^m_{den}$ are binary (ladar hit or pass-through), and we use a binomial distribution to describe the number of hits $M = \Sigma^N_{n=1} Y^n_{den}$ out of N total rays for a given voxel density property den. As above, we integrate over the nuisance parameter den, and we recover the beta-binomial distribution as the marginal likelihood observation model.

$$P(M = m | X^k_{ij} = x) = \int P(m | den) p(den | X^k_{ij} = x) d(den) \quad (3)$$

$$= \binom{N}{M} \frac{B(a_x + M, b_x + N - M)}{B(a_x, b_x)}$$

This model makes the assumption that a voxel with density den generates ladar hits that follow a binomial distribution (the outcome of repeated flips of a biased coin with P(heads)= P(hit)=den.) However, because a given state x has a range of possible densities, which we model with a beta distribution, the distribution over hits M for a given state x becomes a beta-binomial, which has greater variance than a binomial for low amounts of data N, but converges to a binomial as N becomes large.

The "free-space" state does not possess any meaningful material properties beyond density den. Ladar hits occurring in "free-space" are generally the result of noise so we model the non-density material properties as matching the material properties of the states in contact with "free-space". For example, the voxel above a "ground state" voxel may contain many pass-throughs with a single hit due to noise that has an appearance that matches the "ground state". If we modeled the appearance of "free-space" as uniform, then the strong match in appearance data with the "ground state" may overwhelm the density information and prevent the voxel from correctly being classified as "free-space". By setting the appearance properties of "free-space" to match the state it is in contact with ("ground" in this example), the transition to "free-space" is decided solely on density information.

Although we expect obstacles to generally have a fairly high density den, we cannot hope to build an accurate observation model for the appearance of each of the innumerable obstacles one might encounter in outdoor environments, so we simply use a single "obstacle" state with a corresponding uniform distribution over the observable range of material appearance properties. We rely on accurately modeling the features of the trained states (e.g. ground and vegetation) to detect obstacles as a default option when none of the other states are consistent.

Voxel Column Structure

As we move from lower to higher voxels within a column, we expect to move from "ground" to "vegetation", or perhaps "ground" to "obstacle" and eventually to "free-space". We never expect "free-space" to be found below "ground", nor do we expect "vegetation" to be suspended above "free-space". This type of structure is naturally imposed by introducing a Markov dependency between voxel states that restricts vertical transitions, thus defining a hidden Markov model within each voxel column. However, the duration of states such as "ground" and "vegetation" are not well modeled as states in a Markov chain which would induce a geometric distribution on the duration of states. We resort instead to a hidden semi-Markov model (HSMM) over voxel states, which explicitly represents a state duration (or height distribution) over voxels for each state value.

As shown in FIG. 5B, we associate a single HSMM chain structure with each column class $C_{ij}$, which makes the resulting column model a mixture of HSMMs. The durations of the ground and class states describe the height of those terrain elements and are given by $H^g_{ij}$ and $H^c_{ij}$.

The vertical structure helps constrain the location of variables of interest such as the ground height hidden beneath dense vegetation. For example, in FIG. 5B, if we observe measurements that make $X^5_{ij}$ likely to be "vegetation" and $X^6_{ij}$ likely to be "free-space", then the HSMM chain for column class $C_{ij}$="vegetation" would be likely, and we would also expect a "ground" to "vegetation" transition somewhere below $X^5_{ij}$ because of our vertical transition structure. As described below, we can incorporate other information such as the expected vegetation height and the location of surrounding ground to further constrain the ground height even if it is hidden below dense vegetation and has no direct observations. This neighborhood information is incorporated into the column HSMM models as a prior over the duration $H^g_{ij}$ of the "ground" state and the duration $H^c_{ij}$ of the "class" state.

Horizontal Neighborhood Structure

In addition to the vertical structure captured by the HSMM column models, there are also significant horizontal dependencies between neighboring columns. The model encodes assumptions of class continuity, the smoothness of ground, and the similarity of vegetation height. This contextual information helps constrain the problem, especially in areas where dense vegetation hides the ground surface or in areas with missing or ambiguous sensor data.

As shown in FIG. 5C, we model horizontal structure using two distinct but interacting Markov random fields (MRFs) for class $C_{ij}$ (MRF 26 in FIG. 3) and ground height $H^g_{ij}$ (MRF 24 in FIG. 3), and a latent variable (28 in FIG. 3) for the common class height $H^c$ across all columns. These variables interact through the HSMM column models by imposing a prior over the state durations associated with $H^c_{ij}$ and $H^g_{ij}$ and over the column class models $C_{ij}$.

The neighborhood dependency of $C_{ij}$ reflects the prior assumption that class identities are positively correlated with their neighbors so voxel columns tend to cluster in contiguous groups of the same class. We express this preference using the conditional MRF distribution $$P(C_{ij} = c \mid C_{N_{ij}}) \propto \exp\left(-\lambda_C \sum_{\{s,t\} \in N_{ij}} (c \neq c_{st})\right) \quad (4)$$

where $N_{ij}$ is the set of neighboring indices and $C_{Nij}$ is the set of classes in the neighborhood of the ijth voxel column.

Ground height varies smoothly from one patch of ground to the next, so we expect that $H^g_{ij}$ will be tightly correlated with nearby values. We express this belief using a Gaussian Markov random field $$P(H^g_{ij} = h \mid H^g_{N_{ij}}) \propto \exp\left(-\frac{1}{2\sigma_G^2}\left(h - \frac{1}{\lceil N_{ij} \rceil}\sum_{\{s,t\} \in N_{ij}} h^g_{st}\right)^2\right) \quad (5)$$

where $[N_{ij}]$ is the size of the neighborhood.

We also expect that vegetation of the same class c has a similar height Hc with some variation. This assumption may not be valid for obstacles, so we only apply it to vegetation classes. Given the common height of the vegetation in this area $H^c$, we model the expected variation with a Gaussian truncated by the interval of possible class heights $I[h^c_{min}, h^c_{max}]$ $$P(H^c_{ij} = h \mid H^c) \propto I_{[h^c_{min}, h^c_{max}]} \exp\left(-\frac{1}{2\sigma_{Hc}^2}(h - h^c)^2\right) \quad (6)$$

Because of the variation between different types of obstacles, we treat the class height of obstacle columns as independent.

Other constraints can also be included in the model. For example, we can fix the ground height under the wheels of the vehicle since these ground heights are known. The smooth ground prior in equation 5 then allows this information to propagate through the model and helps constrain the surrounding area.

Our use of Markov random fields to encode spatial correlations among variables is reminiscent of recent work in texture segmentation, where an image is assumed to be composed of a number of contiguous regions of uniform texture. One approach uses one MRF layer to classify textures and a second MRF layer that generates textures using separate parameters for each class. D. E. Melas, et al., "Double markov random fields and bayesian image segmentation," *IEEE Trans. Signal Processing*, vol. 50, no. 2, pp 357-365, February 2002. This "double Markov random field" structure is related but distinct from our use of two MRFs in the terrain model described above. Similar to the double MRF, we maintain a single MRF for class segmentation that interacts with another MRF representing the ground surface, but rather than the parameters of one MRF depending on the states of the other, we interpret columns of data based on both the class MRF and the ground MRF.

Markov random fields have also been used in medical imaging applications to segment various tissues from 3D volumetric data. Y. Zhang, et al., "Segmentation of brain mr images through a hidden markov random field and the expectation-maximazation algorithm," *IEEE Trans. Med. Imag.*, vol. 20, no. 1, pp. 45-57, 2001. Here material properties were represented in a voxel-based representation similar to our terrain model. However, the MRF was defined over the full 3D neighborhood of the voxel, whereas we are able to exploit inherent structure in our problem domain to keep the computationally demanding MRF structures to 2D and handling our 3D data in terms of voxel columns.

Inference

The interacting Markov random fields of our model capture important structure, but these dependencies prevent analytic determination of the posterior distribution $P(C, H^g, H^c|Y)$ The set of HSMMs that describe the data in each column of voxels can efficiently produce distributions over the state durations, which makes it easy to sample from the conditional distribution $P(C_{ij}, H^g_{ij}, H^c_{ij}|Y_{ij}, C_{Nij}, H^g_{Nij}, H^c)$, so we use Gibbs sampling to approximate inference.

---

Algorithm 1 Gibbs sampling from the model

---

Sample common class heights $h^c$ from $P(H^c | H^c_{ij \in IJ})$
using all the column class height samples of the same class
for all MRF voxel columns ij do
    Find ground and class priors from neighbors:
        $P(H^g_{ij} | H^g_{Nij})$
        $P(C_{ij} | C_{Nij})$
    for all Classes c do
        Find class height prior from common class height of
        same class:
            $P(H^c_{ij} | H^c)$
        Use class HSMM to find probability of the data and
        distributions over the ground and class height:
            $P(Y_{ij} | C_{ij} = c, H^g_{Nij}, H^c)$
            $P(H^g_{ij} | C_{ij} = c, Y_{ij}, H^g_{Nij}, H^c)$
            $P(H^c_{ij} | C_{ij} = c, Y_{ij}, H^g_{Nij}, H^c)$
    end for
    Compute class distribution:
        $P(C_{ij} | Y_{ij}, C_{Nij}, H^g_{Nij} H^c)$
            $\propto P(Y_{ij} | C_{ij}, H^g_{Nij} H^c)P(C_{ij} | C_{Nij})$
    Sample $c_{ij}$ from $P(C_{ij} | Y_{ij}, C_{Nij}, H^g_{Nij}, H^c)$
    Sample $h^g_{ij}$ from $P(H^g_{ij} | C_{ij} = c_{ij}, Y_{ij}, H^g_{Nij}, H^c)$
    Sample $h^c_{ij}$ from $P(H^c_{ij} | C_{ij} = c_{ij}, Y_{ij}, H^g_{Nij}, H^c)$
end for

---

Algorithm 1 in table 1 describes the application of Gibbs sampling to our model. The HSMM column models require a distribution over class heights which comes from the common class height latent variable HC, as shown in FIG. 5C. Samples of the common class height are produced from its conditional distribution given the current column class height samples $h^c_{ij}$ $$P(H^c = h | H^c_{ij \in IJ}) \propto \exp\left(\frac{-1}{2\sigma^2_{H^c}/D^c}\left(h - \frac{1}{D^c}\sum_{ij \in IJ, c_{ij}=c} h^c_{ij}\right)^2\right) \quad (8)$$

where $D^c$ is the number of columns with class c.

Once the common class heights $H^c$ have been sampled, each voxel column is sampled. The first step of the sampling procedure is to find the priors over class $C_{ij}$ class height $H^c_{ij}$ and ground height $H^g_{ij}$ from the neighbors, as given in equations 4 and 5, and the common class heights $H^c$ as given in equation 6. The priors on $H^c_{ij}$ and $H^g_{ij}$ are then incorporated into the HSMM model as priors over state durations and are shown in the subsequent equations as $P(H^c_{ij} = h | H^c)$ for the class state x=c or $P(H^g_{ij} = h | H^g_{Nij})$ for the ground state x=g.

Once the prior distributions are found, the class HSMM structures are used to find the probability of the data and the state duration probabilities for each class. HSMMs use a variant of the standard forward-backward dynamic programming solution used for inference in regular HMMs. As shown in FIG. 5B, an HSMM maintains durations (corresponding to height in our case) so that a single state is active over a number of spatial steps up the chain. That formalism is very natural for finding ground height or class height because the neighborhood information can be included as a prior on the corresponding state duration.

The forward-backward computations are still performed over the individual spatial steps $X^k_{ij}$ as in an HMM, but with an HSMM one must solve for the duration of each state, so in addition to summing over possible state transitions x', we also sum over possible state durations h. Equations 9 and 10 give the HSMM forward and backward probabilities $\alpha^k_{ij,c}$ and $\beta^k_{ij,c}$ for spatial step k of the class c chain in MRF voxel column ij. We use the observation independencies and the deterministic transitions of our chain structures to reduce the computational complexity. We use the notation $x^-$ and $x^+$ to refer to the previous and next states in the chain of the current class.

$$\alpha^k_{ij,c}(x) = P(\text{state } x \text{ ends at } k, Y^{1:k}_{ij} | C_{ij} = c, H^g_{Nij}, H^c) \quad (9)$$

$$= \sum_{x'} \sum_h P\left(\begin{array}{c} X^k_{ij} = x, X^{k-h}_{ij} = x', \\ H^x_{ij} = h, Y^{1:k}_{ij} | C_{ij}, H^g_{Nij}, H^c \end{array}\right)$$

$$= \sum_h \prod_{k'=k-h+1}^{k} P(Y^{k'}_{ij} | x) P(H^x_{ij} = h | H^g_{Nij}, H^c) \alpha^{k-h}_{ij,c}(x^-)$$

$$\beta^k_{ij,c}(x) = P(Y^{k+1:K}_{ij} | \text{state } x \text{ ends at } k, C_{ij} = c, H^g_{Nij}, H^c) \quad (10)$$

$$= \sum_{x'} \sum_h P\left(\begin{array}{c} Y^{k+1:K}_{ij} | X^k_{ij} = x, X^{k+h}_{ij} = x', \\ H^{x^+}_{ij} = h, C_{ij}, H^g_{Nij}, H^c \end{array}\right)$$

$$= \sum_h \prod_{k'=k+1}^{k+h} P(Y^{k'}_{ij} | x^+) P(H^{x^+}_{ij} = h | H^g_{Nij}, H^c) \beta^{k+h}_{ij,c}(x^+)$$

Because we know by assumption that the chain must end in the final state x free space, the probability of the data for class c is the final value of cc in that state.

$$P(Y_{ij} | C_{ij} = c, H_{Nij}^g, H^c) = \alpha^K_{ij,c}(x = \text{free-space}) \quad (11)$$

As described in Algorithm 1, this is combined with the class prior $P(C_{ij}|C_{Nij})$ to find the distribution over classes, which is used to sample a new class.

Finding the distribution over state durations involves combining α and β. As above, equation 12 takes advantage of the deterministic transitions of the chain structures to reduce computation.

$$\zeta_{ij,c}^x(h) = P(\text{state } x \text{ has duration } h \mid Y_{ij}, C_{ij} = c, H_{N_{ij}}^g, H^c) \quad (12)$$

$$= \sum_k P(X_{ij}^k = x, X_{ij}^{k-h} = x^- \mid Y_{ij}, C_{ij}, H_{N_{ij}}^g, H^c)$$

$$= \sum_k \prod_{k'=k-h+1}^{k} P(Y_{ij}^{k'} \mid x) P(H_{ij}^x = h \mid H_{N_{ij}}^g, H^c) \alpha_{ij,c}^{k-h}(x^-)$$

$$\beta_{ij,c}^k(x)$$

We know that in each chain, every state transition must occur after some duration, so we can normalize by $\Sigma_h \zeta_{ij,c}^x(h)$ to get the posterior on ground and class height conditional on the neighbors. Samples are then drawn from these distributions.

$$P(H_{ij}^g = h \mid C_{ij}^* = c, Y_{ij}, H_{N_{ij}}^g, H^c) = \zeta_{ij,c}^{x=\text{ground}}(h)$$

$$P(H_{ij}^c = h \mid C_{ij}^* = c, Y_{ij}, H_{N_{ij}}^g, H^c) = \zeta_{ij,c}^{x=\text{state } c}(h) \quad (13)$$

The time complexity of HSMM calculations is grater than an HMM because of the sum over possible durations, but the observation likelihood products $\pi P(Y_{ij}^{k'} \mid x)$ can be pre-computed and the state durations to search over can be constrained based on the priors to reduce the complexity to O (num Voxels*numStates*maxDuration) for a single chain.

Although it is typically difficult to show that Gibbs sampling has converged, we have found empirically that the model finds a good estimate quickly, allowing for real-time execution.

Learning

The model described above incorporates prior knowledge about the structure of the environment, but the specific model parameters must be learned from training data. These parameters include the sensor observation models for each state and the neighborhood interactions for class, class height, and ground height. The generative nature of our model allows us to decouple the learning problems, and train each of these observation and neighborhood interaction models individually, thus greatly simplifying the learning task.

Collecting labeled training data is often expensive, especially in outdoor environments where there can be high variation in sensor readings so that a large training set is needed. We use an approach based on C. Wellington et al., "Online adaptive rough-terrain navigation in vegetation," in *IEEE Int. Conf. on Robotics and Automation*, April 2004, to collect large quantities of labeled training data to automatically train our observation models. Specifically, we drive through representative terrain of a single class such as "vegetation" and store the sensor measurements from the voxels of columns that we drive over as training examples for that class. This process is then repeated for other classes such as "ground". Unlike C. Wellington, supra, which directly trains on the height of different types of vegetation, we only train on the various material properties of vegetation voxels, allowing us to remain general across vegetation heights.

Each labeled voxel collected by driving through representative terrain is used as a training example for the observation models in equations 1, 2, and 3. For appearance data such as remission, infrared and color, the mean values from each voxel are used to train the GMM observation models (i.e. $\text{rem}_i$, $\sigma_i^2$, P(i) in equation 1) and the variance of measurements within the voxels is used as the mixture of Gaussians measurement model variance ($\sigma_y^2$ in equation 2).

Hit and pass-through data from the labeled training voxels are used to find the maximum likelihood parameters of the beta-binomial density model ($a_x$ and $b_x$ in equation 3) for each class state x using a Newton-Raphson method D. M. Smith, "Algorithm AS 189: Maximum likelihood estimation of the parameters of the beta binomial distribution," Applied Statistics, vol. 32, no. 2, pp. 196-204, 1983. This handles class states like "ground" and "vegetation", but the density of "obstacle" and "free-space" states must also be trained. The "free-space" density can be trained using data that includes insects or dust that occasionally returns a ladar point, or it can just be set manually to strongly favor empty space. Similarly, the "obstacle" density can be trained using hit and pass-through data from representative obstacles, or it can be set manually to favor dense objects.

The priors given in equations 4 and 5 describe how class and ground height depend on their neighbors, and the prior in equation 6 describes how column class heights are related to the common class height. Each of these priors contains parameters that quantify the tendency for classes to clump together, the smoothness of the ground, and the variability of vegetation class heights. As above, we train these parameters by driving over representative terrain.

As we drive over an area, we record the ground heights measured by the location of our wheels. We use these height sequences to find the standard deviation $\sigma_G$ of typical ground height variation between voxel columns, which gives us the maximum likelihood estimate of our Gaussian MRF ground neighborhood prior. S. S Saquib et al., "ML parameter estimation for markov random fields with applications to bayesian tomography," *IEEE Trans. On Image Processing*, vol. 7, no. 7, pp. 1029-1044.

Similarly, as we drive through vegetation, we get an approximate vegetation height measurement by taking the highest ladar hit and subtracting the known ground height (from the wheel locations). Because we assume that vegetation heights are independent given the common vegetation height in the area, we can find the class prior standard deviation $\sigma_{Hc}$ directly from this sequence of class heights.

The class interaction prior $\lambda_C$ gives the probability that a class transitions to a different class. This could be estimated directly using pseudo-likelihood methods with class-labeled data over a large area that includes many class transitions, but unlike the labeled data for the observation models or the ground and class height interactions, this type of training data is difficult to collect. However, changing the class interaction prior affects the system output in an intuitive way by controlling how much classes tend to clump together, so this parameter can be set manually.

Simulation Results

We have presented a terrain model that includes spatial correlations to better handle missing and ambiguous data in dense non-penetrable vegetation. The model is designed to recover an accurate estimate of the ground surface despite having only indirect observations and without needing to explicitly train on the vegetation height. This section shows a simple two-class simulation result that verifies these properties.

Figures 6A, 6B, 6C:
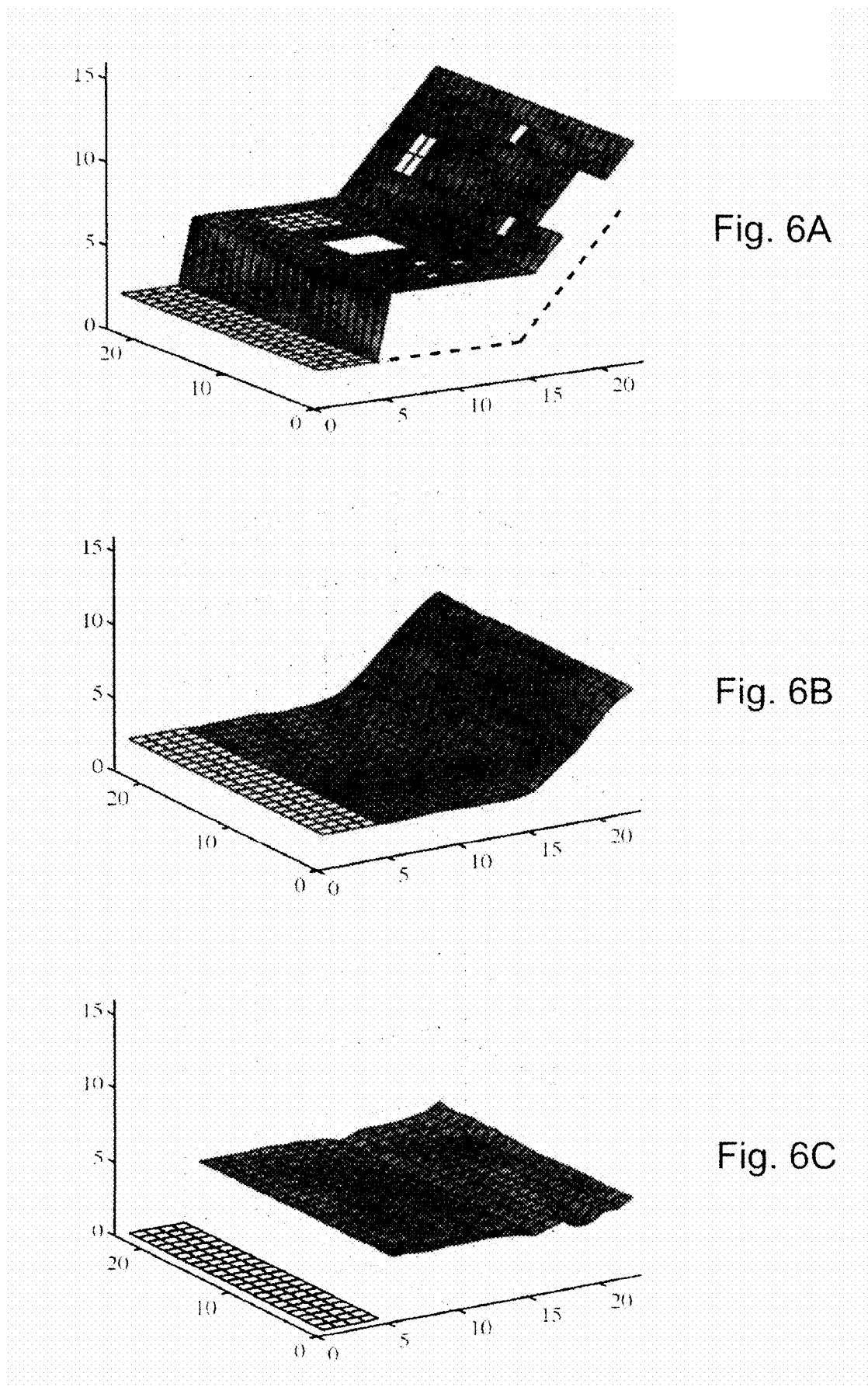
FIGS. 6A, 6B, and 6C illustrate a simulation showing a transition from ground to tall vegetation with missing and ambiguous data. The dashed line in FIG. 6A shows the true ground height. The model is able to infer the hidden ground surface in FIG. 6B, the height of the vegetation in FIG. 6C, and the correct classifications.

FIG. 6A shows simulated data of a transition from ground to tall vegetation. Imagine the vehicle is approaching from the left, so initially the sensors get measurements of the ground, the front of the vegetation, and the top of the vegetation, but because the vegetation is dense there are no range measurements of the ground surface under the vegetation. The dashed line gives the true ground height, showing that the ground under the vegetation is flat and then angles up a hill. There are some columns with missing data, and some voxels in the vegetation match the appearance of ground, as shown by their light gray color. Although there is no data under the ground or vegetation surfaces, the voxels above the ground and vegetation are full of pass-throughs. The ground and vegetation appearance models were set to match the simulated input appearance data so we could study the effects of spatial correlation in the model.

Because this example assumes the vehicle is approaching from the left, the system was initialized with the "ground" column class, a ground height of 2, and a voxel state class height of 0 (the voxel state "ground" class has no height). The sampling inference procedure given in table 1, supra, was then run for 100 iterations (each iteration produces samples from every column) which took 0.5 seconds. The final 50 samples from each column were used to find the most common class, the mean ground height, and the mean class height (although we allowed 50 iterations of "burn in" time to let the sampling procedure converge, the system actually converged after approximately 5 iterations).

FIG. 6B shows the ground height estimates, FIG. 6C gives the class height estimates, and both show the classification results for each column. These values represent the most likely explanation of the data given the prior knowledge encapsulated in the model. Although the system was never trained on the height of the vegetation, it was able to recover the vegetation height and use it to estimate the ground height including the hill. The ground smoothness and similar vegetation height assumptions combine to constrain the ground height at the transition from visible ground to vegetation and propagate the observed vegetation height at the transition through the rest of the simulated region.

The model structure also allowed the system to handle missing and ambiguous data. The class prior makes it likely that the areas in the vegetation with missing data are also vegetation. The ambiguous data patches in the vegetation have appearance properties similar to ground, but the ground smoothness prior makes it extremely unlikely for the ground to be at that height, so the model infers that these areas are actually vegetation.

The class height estimates in FIG. 6C are not completely uniform. There is a crease where the hill starts because the model ground prior enforces a smooth transition from the flat region to the hill in FIG. 6B whereas the simulated data in FIG. 6A has an abrupt angle change. The class heights at the far right become slightly larger because of the conflict between the ground prior enforcing a smooth flat ground estimate and the class height prior enforcing a uniform estimate of the vegetation height.

The class height predictions are slightly lower in the missing data areas because of asymmetric data evidence. In the absence of any data, the class prior would give the missing data areas a symmetric class height distribution around the true class height. However, the large number of pass-throughs above the missing data areas produces a strong constraint that cuts off the top of the class height prior distribution. Therefore the class height samples in areas with missing data are biased low. Because there are no hits in that patch, it is reasonable to expect that the vegetation height is lower in this area.

Run Time/Results

Our project team has automated a John Deere 6410 tractor and equipped it with many sensors for localization and perception. The vehicle has a high-resolution stereo pair of digital cameras, an infrared camera, and two SICK laser rangefinders (ladar) mounted on custom actively-controlled scanning mounts. The first scanning ladar is mounted on the roof to get range data over a large area in front of the vehicle, and the second scanning ladar is mounted on the bumper to get high density measurements of nearby terrain and better penetrate upcoming vegetation. The cameras and scanned ladars are precisely calibrated and tightly synchronized with an accurate global vehicle pose estimate, allowing the system to accumulate data into a high quality global map.

Performing inference in this model is computationally intensive because of the repeated calculations necessary to sample from the model. We maintain a 150×150 grid of 15 cm square voxel columns in our terrain map, which covers a 22.5 meter square area. Our system runs a loop that updates the local terrain map at approximately 1 Hz. Within this loop, the system computes the observation likelihood products, calculates 20 samples from each column in the map, and updates the mean ground height, class height, and most likely class from the samples in each column.

At a vehicle speed of 1 m/s, our procedure results in approximately 200 samples for a given terrain patch before the vehicle reaches it. Although sampling convergence is difficult to prove, the system generally finds the solution quite rapidly in our experiments, allowing us to run the system in real time.

We have tested this model with real data at a nearby working farm and an undeveloped area with tall weeds. The following examples highlight the benefits of including spatial correlations in areas with dense non-penetrable vegetation. We demonstrate the system's ability to detect obstacles in vegetation and we also show what happens when the smooth ground assumption is violated.

In each case, after training the model on representative terrain, we drive the vehicle through the test area while letting the Gibbs sampler run continuously. Running at 1 Hz, the system calculates the observation likelihoods, computes samples from the model, and updates the local terrain map with the most commonly sampled class and the mean of the ground height and class height samples. We compare our model result with a system that uses the same trained observation models but makes independent classifications for each column instead of incorporating spatial structure. This comparison system uses the lowest hit or pass-through in each "vegetation" column as its estimate of ground height.

The results use four classes: "ground", two "vegetation" classes, and an "obstacle" class. For the reported heights, the two "vegetation" classes show the transition from "ground" to "vegetation", the "ground" class shows the transition from "ground" to "free-space", and the "obstacle" class shows the transition from "obstacle" to "free-space".

White Shed

Figure 7A:
FIG. 7A illustrates a white shed having an appearance that is similar to the "ground" class, but the smooth ground prior to the shed makes such a height change very unlikely so the spatial model classifies the shed as an "obstacle" as shown in FIG. 7B. Classifying each column independently as shown in FIG. 7C results in the shed being classified as "ground".
Figure 7B:
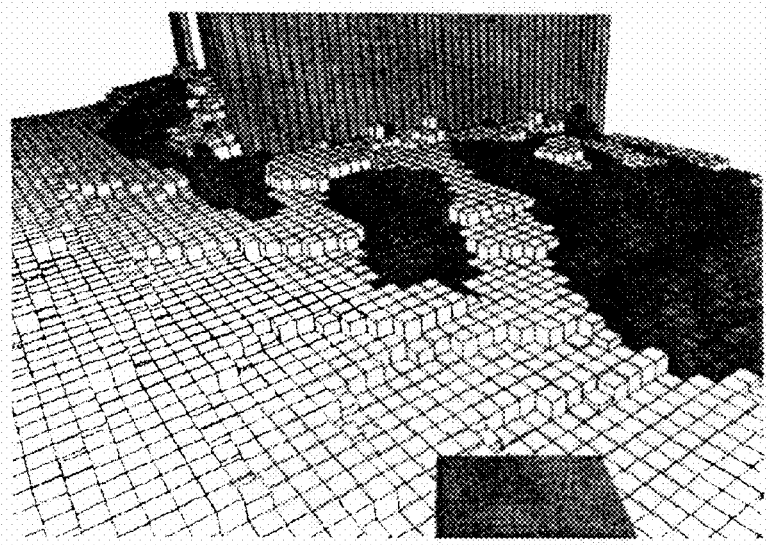

FIG. 7A shows the tractor as it approaches a white shed. This is a large obstacle that could be reliably detected in a variety of ways, but it will serve as a good example of how the various pieces of our model interact to produce the correct result. FIG. 7B shows the output of our model, including a reasonable classification of the scene and a smooth ground estimate that would work well for vehicle navigation. It classifies the shed as an obstacle and correctly captures the hill sloping down to the right despite the presence of sparse vegetation. This example is interesting because for voxels containing the walls of the shed, the "ground" class is much more likely, on the basis of the observed data, than the broad uniform "obstacle" class. However, the spatial prior on a smooth ground surface makes it extremely unlikely that the ground height would have a tall step discontinuity at the shed wall. Because the density and appearance data are not well described by the vegetation class, the shed is correctly classified as an obstacle.

Figure 7C:
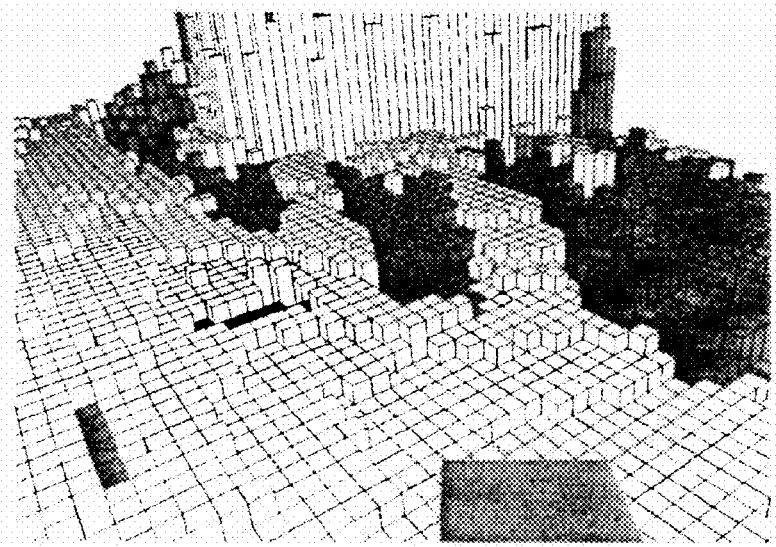

FIG. 7C shows the output of the model when the neighborhood interactions are ignored and the columns are assumed to be independent. Without neighborhood information, classification is based solely on the data likelihood for each column HSMM model. Lacking the smooth ground prior, the wall is classified as a collection of tall columns of ground voxels. A vision system that ignores 3D structure and only makes a classification based on the learned observation models we use would produce a similar result. FIG. 7C also shows that without the spatial ground and class priors, the ground height estimates and classification labels are generally more noisy.

Tall Vegetation

Figure 8A:
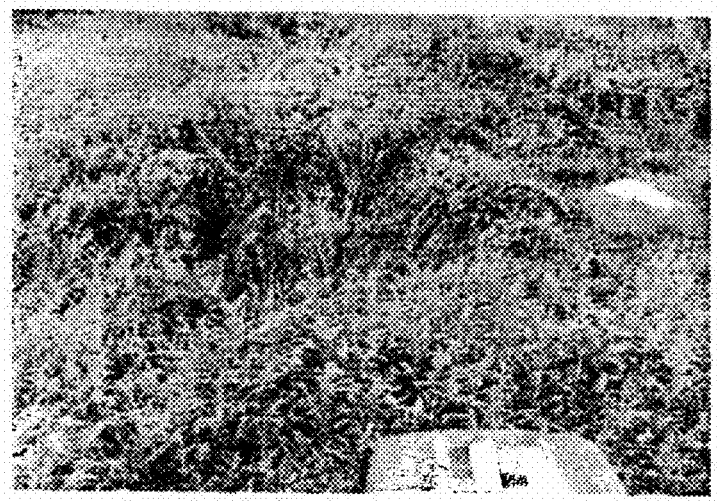
FIG. 8A illustrates a challenging scene with a person in camouflage in tall weeds with low grass and a dirt mound. The person and dirt mound both have a high temperature that matches the "ground" class, but the spatial model disambiguates the two as shown in FIG. 8B by inferring the ground beneath the vegetation. Classifying each column independently as shown in FIG. 8C shows the ground height on top of the dense tall weeds and misclassifies part of the person and dirt mound.
Figure 8B:
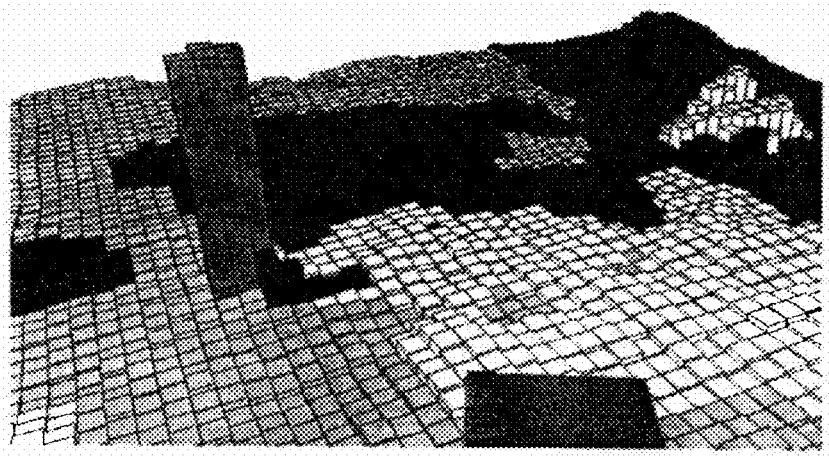

FIG. 8A shows a challenging scene containing a camouflaged person in tall weeds with low grass and a small dirt mound to the right. FIG. 8B shows that both the person and the dirt mound have high infrared temperature, so a simple obstacle detection system that performed a threshold on temperature may classify both of these objects as obstacles. We show that the structural assumptions embodied in our model allow the model to disambiguate these two objects.

We trained the model on bare ground, low grass, and tall weeds. FIG. 8B gives the model ground height and classification results. Inference over the model results in the correct classification of the person and the dirt mound, as well as the two types of vegetation. The area to the right of the person in the shadow of the tall weeds is classified as ground. Although that area is actually low grass, because the model has no data from the area, ground is a reasonable estimate.

Using the model structure and the known ground height under the vehicle allows the model to produce reasonable estimates of the ground height even in areas where the ground is hidden. In addition to providing a smoothing prior, neighborhood interactions allow information to propagate through the model. Fixing the heights under the wheels affects the ground estimates in the surrounding area. Columns with little or no data can still produce useful estimates by relying on their neighborhood. The model can infer the common vegetation height of the tall weeds from areas where the ground is more directly observable, such as under the vehicle or the transition to tall weeds behind the person. The assumption of a common vegetation height, in turn, allows the model to infer the ground height in areas where the ground is not directly observable. Knowing the ground height allows the model to explain the dirt mound as a rise in the ground but the person as an obstacle.

Figure 8C:
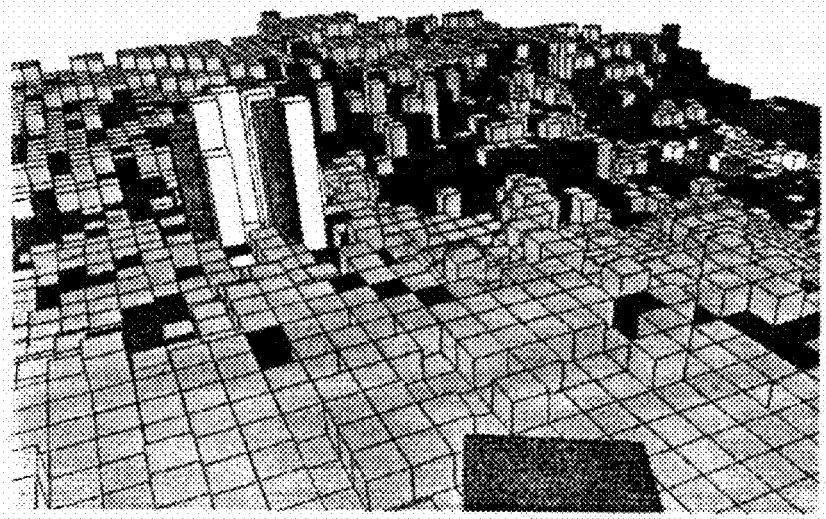

Assuming independence prevents information from propagating through the model, FIG. 8C shows the lowest point and the class estimates when no neighborhood information is used. The lowest point does not penetrate the dense vegetation so it provides poor estimates of the ground height. Both the dirt mound and the person are classified as a mixture of dirt and obstacle columns. Also without neighborhood information, the vegetation class predictions contain many isolated misclassifications due to ambiguous data.

Figure 9:
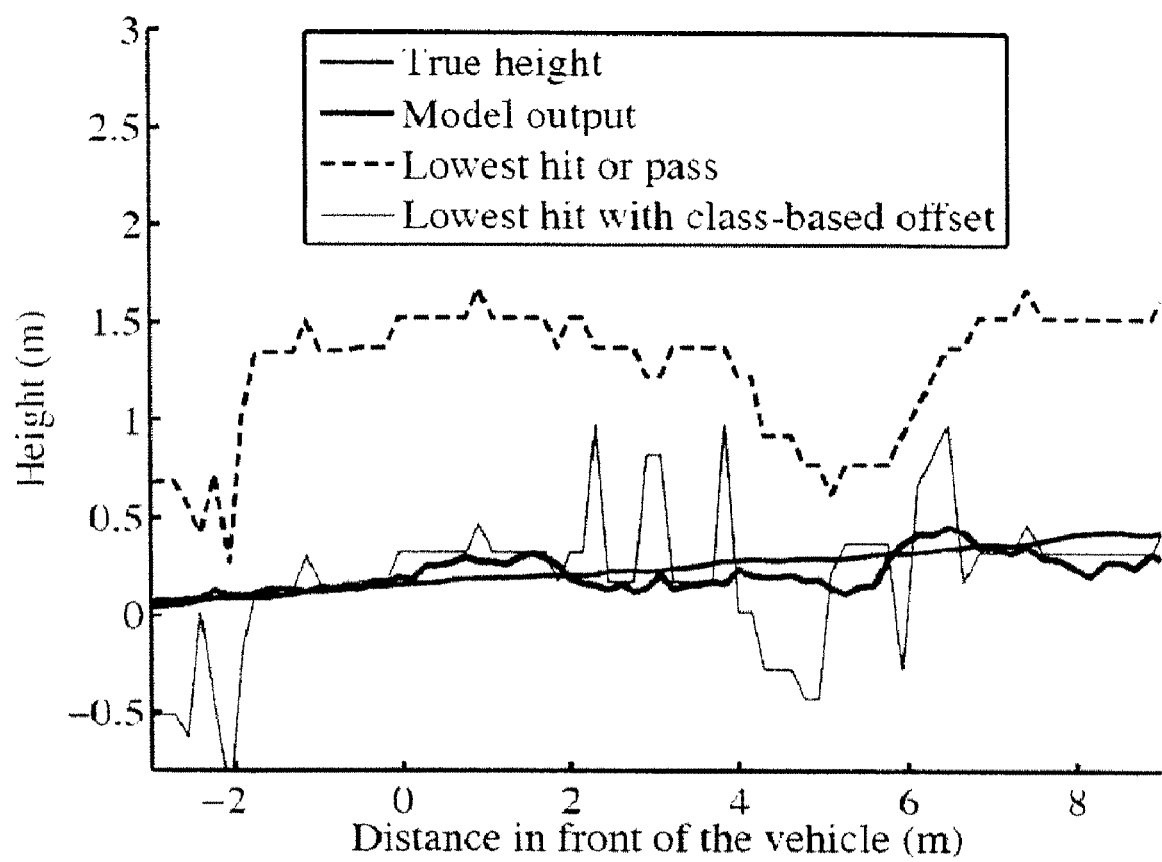
FIG. 9 illustrates a ground estimate comparison for the area in FIGS. 8B and 8C, showing the improved ground height estimates using the spatial model of the present disclosure.

FIG. 9 illustrates the quality of the ground height estimates from FIGS. 8A and 8B. After computing estimates of the ground height using our model, we drove through the scene toward the area between the person and the dirt mound, and made measurements of the ground height using our wheel locations. This trajectory is marked as "True height" in FIG. 10, and offers a comparison for the estimates produced by the model and those using the lowest hit or pass-through in each column. The model ground estimates are fairly smooth and stay within approximately 20 cm of the true value.

Current approaches that filter out vegetation from the ground surface generally rely on the deepest range penetration, but for dense non-penetrable vegetation that performs very poorly as there are no range points that reach the ground. Therefore, in addition to comparing our model to the lowest hit or pass-through, we also compare it to an approach that adjusts the lowest hit in each column based on the independent column classifications shown in FIG. 8C. Instead of using spatial structure to infer the vegetation height from the data as in our model, this approach simply uses the average height of each class from the training data for the offset. FIG. 9 shows that this can work well when the classification is correct and the actual vegetation height matches the training data, but it suffers from the lack of model structure, from misclassification, and the lack of a smoothing prior.

Vegetation on a Slope

The previous section demonstrated how the model's structural assumptions enabled improved ground height estimations. However, in that example the ground was generally flat so a system that simply classified all vegetation as safe could have succeeded without correctly estimating the ground surface (although detecting positive obstacles such as the person would be more difficult without the ground height). This section shows an example where treating vegetation as drivable could lead to dangerous behavior but finding the supporting ground surface enables the vehicle to stay safe.

Figure 10A:
FIG. 10A illustrates a tractor on a steep side slope with dense vegetation at the bottom of the hill. The spatial model infers the ground height beneath the vegetation as shown in FIG. 10B which could correctly trigger a rollover hazard. Classifying each column independently as shown in FIG. 10C incorrectly predicts that the tractor could drive on top of the vegetation.
Figure 10B:
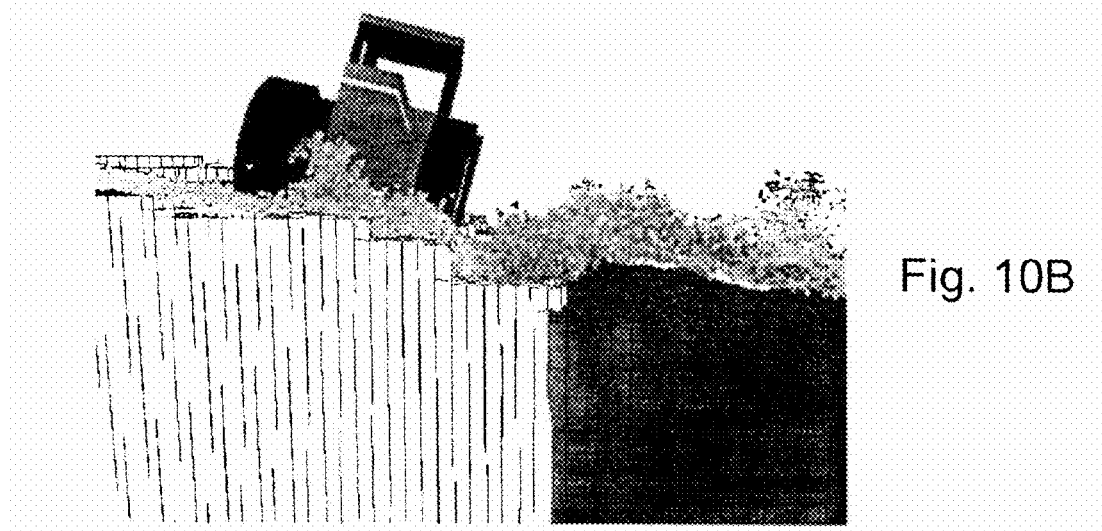
Figure 10C:
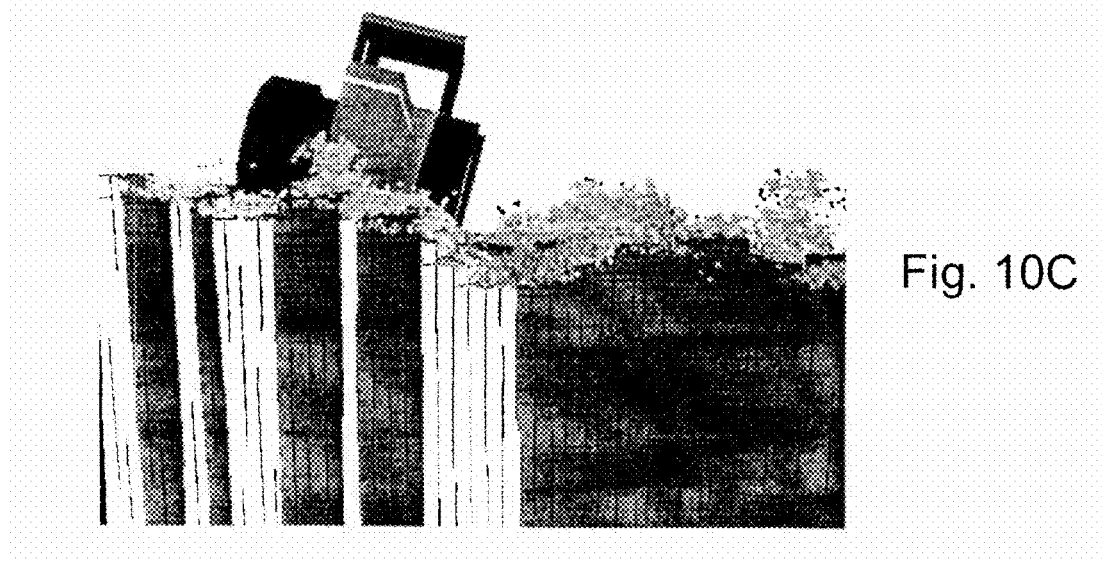

FIG. 10A shows the tractor as it is driving along a path on a steep 14-degree side slope with dense vegetation at the bottom of the hill. The vegetation at the bottom covers and hides the supporting ground surface underneath. FIGS. 10B and 10C show a view from in front of the tractor of the range point data, as well as estimates of the ground height. The path that the tractor is driving on has a high side slope, and the ground becomes even steeper on the lower part of the hill under the vegetation, which could result in a roll-over hazard. The dense vegetation prevents laser measurements of the ground, so a system that uses the lowest point for the ground height would treat the top of the vegetation as the supporting surface, as shown in FIG. 10C. This would make that part of the hill appear to be fairly flat and traversable, when it actually contains a steep side slope and could represent a roll-over hazard.

FIG. 10B shows the spatial model ground height estimates. This approach correctly infers a ground surface below the vegetation, and the resulting ground surface predicts a high slope in that area that could be used with a vehicle model to check for roll-over conditions.

The model assumptions of smooth ground and similar vegetation height enable the system to infer the ground surface below the vegetation, even though the system was never trained on the height of the vegetation. As in the simulation example discussed above, the transition from ground to vegetation at the edge of the path allows the model to infer a vegetation height which then propagates through the spatial correlations in the model to drop the ground surface below the top of the vegetation. The model also tries to produce smooth ground estimates between the observed ground height on the path near the tractor and the data from the bottom of the slope (not visible in the figures). These various constraints combine to produce an accurate ground estimate in this difficult example.

Ledge Step Hazard

The previous sections looked at examples where the model assumptions of smooth ground, class continuity, and similar vegetation height were generally correct. This section explores what happens when model assumptions are broken.

Figure 11A:
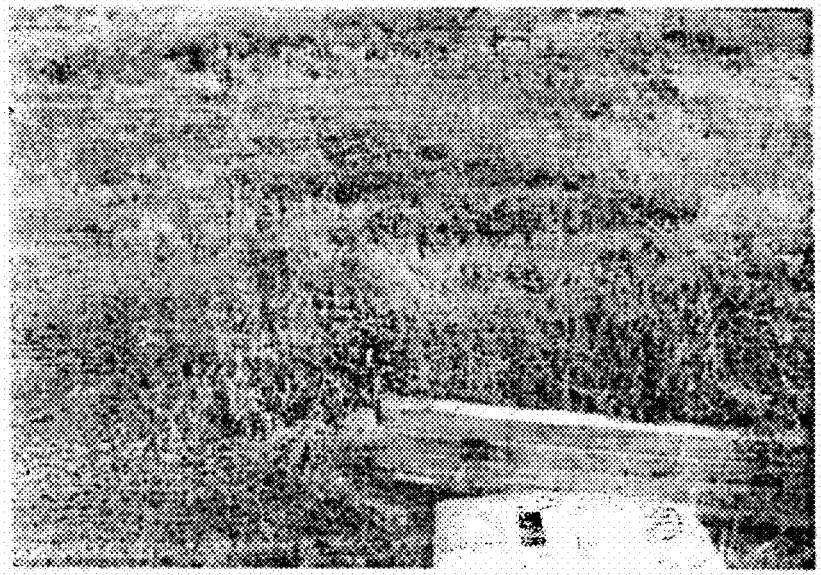
FIG. 11A is a view from the tractor of a ledge creating a discontinuity in the ground surface. The ledge violates the smooth ground assumption so the spatial model in FIG. 11B makes the reasonable inference that the ledge is an obstacle. The model assumptions are not valid for this scene.
Figure 11B:
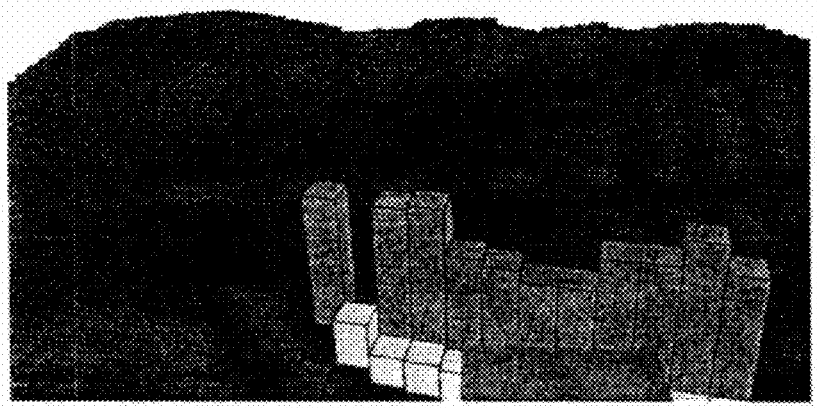
FIG. 11C shows that the resulting ground height predictions beyond the ledge are lower than the true ground height.

Our main test area did not have any areas with non-smooth ground so a wooden ledge was constructed. FIG. 11A shows the tractor as it approaches this ledge, and FIG. 11B gives the model ground height estimates. The ledge has an appearance that matches the ground class, so there is a row of columns classified as ground, but the ground prior makes the taller portions of the ledge unlikely to be ground and their appearance does not match any other class, so the ledge is reasonably classified as an obstacle.

Figure 11C:

As shown in FIG. 11B, the ground estimates beyond the ledge are significantly lower than the true ground height. The model has explained the higher data points beyond the ledge with dense medium height vegetation on low ground instead of short vegetation on higher ground. FIG. 11C provides some insight into why the model produces this estimate. The vehicle is positioned in taller vegetation of similar appearance to the shorter vegetation beyond the ledge. Based on the similarity in appearance, the model infers that the two patches of vegetation belong to the same vegetation class. Consequently, the assumption of common vegetation height propagates the height of the taller vegetation surrounding the vehicle to the area beyond the ledge. This combines with the smooth ground prior to underestimate the ground height beyond the ledge.

Longer Run Through Varied Vegetation

Figure 12:
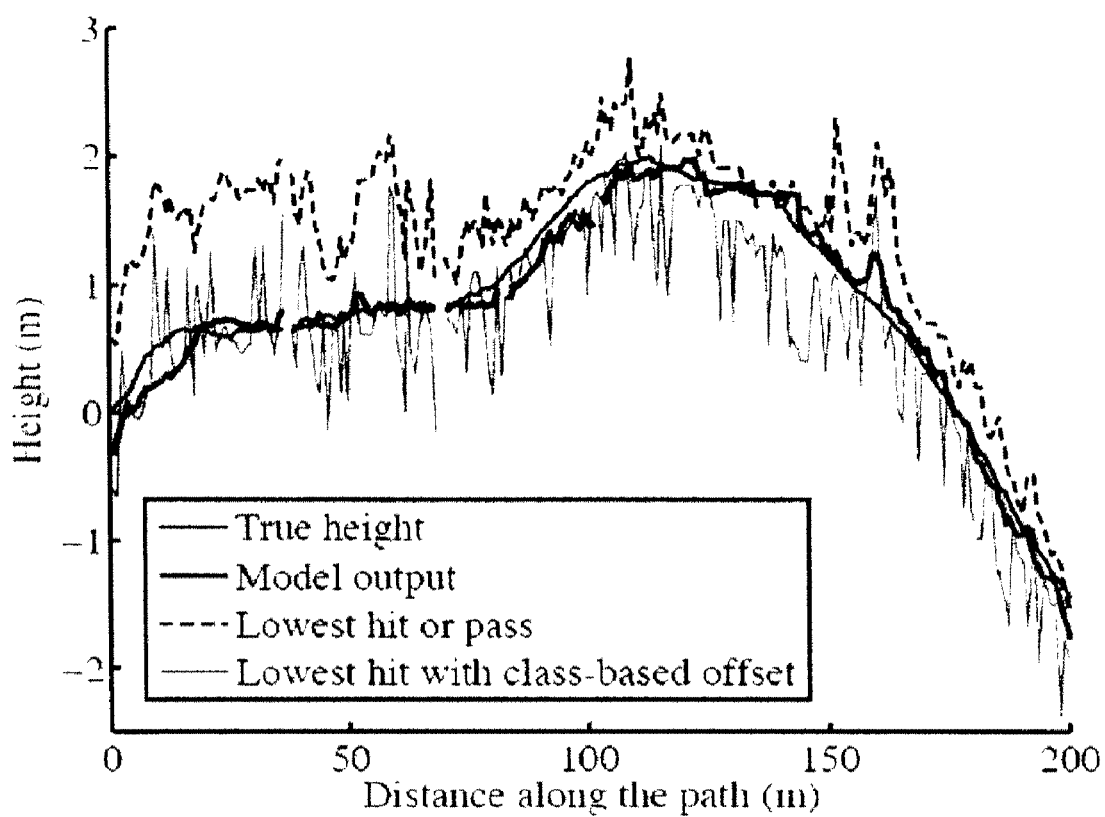
FIG. 12 is a graph illustrating a ground estimate comparison for a longer test path through varied vegetation, showing predictions made six meters in front of the vehicle as the vehicle drove (note that the two axes have very different scales).

FIG. 12 shows ground height estimates for a longer test set through varied vegetation. Unlike FIG. 9, which presents a snapshot of the predictions at different distances in front of the vehicle at a given time, FIG. 12 shows predictions at a constant six meters in front of the vehicle as the vehicle moves forward. The lowest hit line shows that the first 70 m of the path contained two sections of tall dense non-penetrable vegetation, and the remainder of the path consists of low vegetation with various tall sparse vegetation and a few small patches of dense vegetation (e.g. 170 m). The model output is generally smooth and closely matches the true height, whereas the lowest hit rarely reaches the ground, and the estimate using lowest hit with class offset is often correct but very noisy because of misclassifications due to its independence assumption.

Our probabilistic terrain model provides a natural way of combining different types of sensor data with reasonable assumptions about the world—particularly in agricultural applications—such as ground smoothness, class continuity, and similarity in vegetation height. These assumptions are incorporated as a model prior and help constrain the problem when the sensor data is ambiguous. Except for the class neighborhood prior, which can be easily tuned by hand, all model parameters that control the difficult task of weighting the different sensor data appropriately are automatically learned by the system by simply driving through representative terrain. Our approach can find obstacles without needing to explicitly model them or collect obstacle appearance training data.

We have applied this approach in realistic test conditions and have shown that the use of spatial structure in our model improves ground height estimation and obstacle classification over an equivalent model that ignores spatial structure. Although computationally intensive, the algorithm can run in real time for moderate vehicle speeds of 1-2 m/s.

In areas where our model assumptions are generally true, the model structure allows the system to infer the supporting ground surface even when the ground is hidden by dense vegetation. Joint inference of class, ground height, and vegetation height allows the system to produce better estimates of each, because knowing the ground height helps disambiguate obstacles from the ground, and knowing the class and vegetation height helps determine the ground height.

When model assumptions are violated, the model often produces a desirable result, such as treating a ground discontinuity as an obstacle, even though the resulting ground height estimates are inaccurate.

While the present invention has been described in conjunction with preferred embodiments, those of ordinary skill in the art will recognize that many modifications and variations are possible. This document is not to be limited by the forgoing disclosure, but rather is to be limited by the scope of the following claims.

What is claimed is:

1. A system for determining surface height, comprising:
   a sensor array that produces data about a volume in which surface height is determined, said volume being divided into a plurality of voxels;
   a plurality of surface modeling rules that provide domain information for interpreting data from said sensor array, for enforcing spatial constraints vertically among voxels, and for enforcing spatial constraints horizontally among columns of voxels; and
   an inference engine responsive to said sensor array and said surface modeling rules so to classify each voxel, at least certain of said voxels being classified as surface;
   wherein the classification of a voxel is based on the classification of neighboring voxels, wherein said surface modeling rules for enforcing spatial constraints horizontally include two interacting Markov random fields and a latent variable that interact across columns of voxels.

2. The system of claim 1 wherein said domain information is captured in a plurality of sensor models, one for each type of sensor in said sensor array.

3. The system of claim 1 wherein said sensor array includes a camera, an infrared sensor, and a range finder.

4. The system of claim 1 wherein said surface modeling rules for enforcing spatial constraints vertically comprises a hidden semi-Markov model imposed on vertically positioned voxels.

5. The system of claim 1 wherein said horizontal spatial constraints enforced by said surface modeling rules comprise assumptions of class continuity, surface smoothness and similarity of vegetation height.

6. The system of claim 1 wherein said classifying is carried out iteratively by said inference engine.

7. The system of claim 1 wherein said enforcing spatial constraints horizontally includes enforcing priors horizontally among columns of voxels.

8. A computer-implemented method for determining surface height, comprising:
   producing, using a computer, sensor data about a volume in which surface height is determined, said volume being divided into a plurality of voxels; and
   classifying each voxel using the computer, with at least certain of said voxels being classified as surface, by applying a plurality of surface modeling rules, said surface modeling rules providing domain information for interpreting sensor data, for enforcing spatial constraints vertically among voxels, and for enforcing spatial constraints horizontally among columns of voxels;
   wherein the classification of a voxel is based on the classification of neighboring voxels, wherein said surface modeling rules for enforcing spatial constraints horizontally are implemented using two interacting Markov random fields and a latent variable that interact across columns of voxels.

9. The method of claim 8 wherein said domain information is captured in a plurality of sensor models, one for each type of sensor used to produce sensor data.

10. The method of claim 9 wherein said sensor models include a camera, an infrared sensor, and a range finder sensor models.

11. The method of claim 8 wherein said surface modeling rules for enforcing spatial constraints vertically are implemented using a hidden semi-Markov model on vertically positioned voxels.

12. The method of claim 8 wherein said horizontal spatial constraints enforced by said surface modeling rules comprise assumptions of class continuity, surface smoothness and similarity of vegetation height.

13. The method of claim 8 wherein said classifying is carried out iteratively.

14. The method of claim 8 wherein said enforcing spatial constraints horizontally includes enforcing priors horizontally among columns of voxels.

* * * * *